US008013783B2

(12) United States Patent
Lomes et al.

(10) Patent No.: US 8,013,783 B2
(45) Date of Patent: Sep. 6, 2011

(54) PHASED ARRAY ANTENNA HAVING INTEGRAL CALIBRATION NETWORK AND METHOD FOR MEASURING CALIBRATION RATIO THEREOF

(75) Inventors: Alexander Lomes, Western Galilee (IL); Yacov Vagman, Rishon LeZion (IL); Haim Reichman, Mazkeret Batia (IL)

(73) Assignee: Elta Systems Ltd., Ashdod (IL)

( * ) Notice: Subject to any disclaimer, the term of this patent is extended or adjusted under 35 U.S.C. 154(b) by 0 days.

(21) Appl. No.: 12/824,976

(22) Filed: Jun. 28, 2010

(65) Prior Publication Data

US 2011/0122016 A1 May 26, 2011

Related U.S. Application Data

(63) Continuation of application No. PCT/IL2008/001661, filed on Dec. 24, 2008.

(30) Foreign Application Priority Data

Dec. 31, 2007 (IL) .......................................... 188507

(51) Int. Cl.
*G01S 7/40* (2006.01)

(52) U.S. Cl. ........................................ 342/165; 342/169

(58) Field of Classification Search .................. 342/165, 342/169

See application file for complete search history.

(56) References Cited

U.S. PATENT DOCUMENTS

| | | | | |
|---|---|---|---|---|
| 4,517,570 | A * | 5/1985 | Gray, Jr. | 342/372 |
| 4,994,813 | A * | 2/1991 | Shiramatsu et al. | 342/360 |
| 5,412,414 | A | 5/1995 | Ast et al. | |
| 6,084,545 | A | 7/2000 | Lier et al. | |

(Continued)

FOREIGN PATENT DOCUMENTS

EP 0901183 A2 3/1999

(Continued)

OTHER PUBLICATIONS

International Search Report, mailed Jun. 17, 2009, from International Application No. PCT/IL2008/001661, filed Dec. 24, 2008.

*Primary Examiner* — Thomas H Tarcza
*Assistant Examiner* — Timothy A Brainard
(74) *Attorney, Agent, or Firm* — Houston Eliseeva, LLP

(57) ABSTRACT

A phased antenna arrangement and a method for estimating the calibration ratio of an active phased antenna having a plurality of phased array antenna elements are described. The phased antenna arrangement includes a plurality of antenna elements, a plurality of receiving channels, an injection unit for injection of calibrating signals into the receiving channels, a point RF-source, located in a far field zone, a distance measurement unit, an amplitude and phase measurement unit and a data processing unit. The method comprises injecting an internal calibrating signal having a known amplitude and phase to each antenna element. An external calibration signal from a stationary RF-source is sequentially injected to all of the phased array antenna elements so that different phases of the external calibration signal arrive at each of the antenna elements. The differences in phases of the external calibration signal reaching the antenna elements are compensated so as compute an effective signal amplitude that would reach all of the antenna elements at zero phase difference. Calibration ratio is calculated as the ratio between the amplitude of the internal calibrating signal to the effective signal amplitude of the external calibration signal.

14 Claims, 4 Drawing Sheets

U.S. PATENT DOCUMENTS

| | | | | |
|---|---|---|---|---|
| 7,068,218 | B2 | 6/2006 | Gottl et al. | |
| 2002/0067310 | A1* | 6/2002 | Pietrusiak | 342/368 |
| 2002/0171583 | A1* | 11/2002 | Purdy et al. | 342/368 |
| 2003/0038747 | A1* | 2/2003 | Patel et al. | 342/368 |

FOREIGN PATENT DOCUMENTS

| | | | |
|---|---|---|---|
| EP | 1126544 | A2 | 8/2001 |
| EP | 1294047 | A2 | 3/2003 |
| EP | 1329983 | A2 | 7/2003 |

* cited by examiner

PHASED ARRAY ANTENNA HAVING INTEGRAL CALIBRATION NETWORK AND METHOD FOR MEASURING CALIBRATION RATIO THEREOF

FIELD OF THE INVENTION

This invention relates to phased array antennas and in particular to calibration of phased array antennas having field calibration capability.

BACKGROUND OF THE INVENTION

The antenna of an active phased array system must be able to steer its beam so that the system can obtain information about the surroundings in different directions. It is also desirable that the antenna suppress signals from other directions than the direction in which the system is currently transmitting and receiving. A phased array antenna comprises a number transmitting/receiving elements, usually arranged in a planar configuration. Each element, or a group of elements, is driven by a transmit/-receive (T/R) module which controls the phase and the amplitude of the corresponding antenna element.

On transmission of a signal from a phased array antenna, the signal is divided into a number of sub-signals, and each sub-signal is fed to one of the modules. The modules comprise signal channels guiding the sub-signals to the antenna elements. Each signal channel comprises controllable attenuators or amplifiers and controllable phase-shifting devices for controlling the amplification and the phase shift of the modules. The signals transmitted through the antenna elements interfere with each other. By selecting suitable values of the relative amplification and the relative phase-shifting between the modules and by utilizing the interference of the transmitted signals, the directional sensitivity of the antenna can be controlled.

During reception in a phased array antenna, the opposite procedure takes place compared to transmission. Each antenna element receives a sub-signal. The modules comprise signal channels for reception and through these signal channels the sub-signals are collected in a single point in which all sub-signals are added to form a single composite signal. The signal channels for reception also comprise amplifiers and phase shifters, and the directional sensitivity of the antenna for reception can be controlled in a corresponding way as for transmission, by varying the amplification and phase-shifting of the modules.

In order to obtain the desired directional properties of the antenna, it is necessary to minimize the side lobe levels of the antenna. To enable low side lobe levels with an electrically controlled phased array antenna, high accuracy of the amplification and the phase shift in the modules is required. In practice, this is achieved by introducing a calibration function in the antenna system. Central to the calibration concept is the compensation of the various contributions of cables, attenuators, phase shifters, regulators and other parts in the transmit/receive channels which respond differently at different temperatures, for each antenna element and at each radio frequency. The calibration procedure is required to determine what controls should be applied to the transmit/receive modules in order to obtain the desired current distribution on the antenna aperture.

For example, if it is required that the phase of the signal fed to all antenna elements be identical, but it is found during calibration that, owing to mismatches in the phase shifters coupled to first and second antenna element, there is a phase difference between the signals output by a first antenna element and a second antenna element of +15°, then the phase shift signal that is fed to the second antenna element must have a phase offset of −15° relative to the phase shift signal fed to the first antenna in order to compensate for the mismatch in the two phase shifters. Differences between the amplitudes of signals that are output by different antenna elements caused by mismatches in the gains of the amplifiers coupled to the antenna elements are compensated for in a similar manner by applying different gain offsets to the antenna elements relative to a given reference antenna element.

Phased array antenna architectures typically include a calibration network, whose purpose is to provide injection of a predetermined calibration signal to each antenna element and to the T/R module connected to it. Such a calibration network is shown in U.S. Pat. No. 7,068,218 (Göttl et al.) which describes a calibration device for an antenna array, or an improved antenna array, that can be viewed as a set of RF-couplers (one coupler per antenna element) interconnected and driven by a passive network having a common feed point. The passive network splits the drive signal in a predetermined manner so that the signal fed to each antenna element is known in advance and the phase and gain offsets are known and predetermined.

During use, one or more antenna elements may become out of calibration. This can occur, for example, owing to one or more antenna elements being replaced. Since the replacement antenna elements will inevitably have slightly different properties to the original antenna elements, the original offsets will not compensate for slight differences in the phase and gain characteristics of the phase shifters and amplifiers used to feed steering signals to the replacement antenna elements. This typically requires that the complete phase antenna array be returned to the factory for re-calibration in order to establish the new offsets. It is also known to perform the re-calibration procedure in the field, but this then requires a calibration network for which the required offsets are known for each phase shifter and amplifier. Such calibration networks are available but they require sophisticated electronics and are expensive.

U.S. Pat. No. 7,068,218 Göttl et al. discloses a calibration procedure that utilizes, in addition to the operational transmit/receive channels, also an auxiliary injection network, whose contribution must be known in advance. This is determined using the concept of the calibration ratio, which measures the ratio between signals injected externally (in principle from infinity) to those injected internally.

Some antennas are factory calibrated. When deployed, the quality of the calibration is tested by one means or another and if the test fails the antenna is sent back to the factory for recalibration. Other antennas have field calibration capability. A number of approaches for calibration of such antennas have been proposed in prior art.

There is a vast literature of prior art relating to phased antenna calibration and the determination of calibration ratio. Of the many different approaches that are known in the art, all presently fall into one of two categories. Some methods use an external calibration signal that is disposed at infinity so that the respective amplitudes and phases of the external calibration signals injected into each antenna element are the same. This, of course, greatly simplifies the determination of calibration ratio, but is not feasible when there is insufficient space between the external calibration source and the phased array antenna, such as when a phased array antenna is recalibrated in the field.

The other approach disposes the external calibration source proximate each antenna element in turn, while ensuring that the distance from the external calibration source to each antenna element is the same and that the external calibration source is exactly aligned to the optical center of each antenna element. This also ensures that the respective amplitudes and phases of the external calibration signals injected into each antenna element are the same, but requires critical and consequently complex alignment and is both time-consuming and expensive.

Replacement of a failed T/R module during antenna maintenance is a routine procedure, which requires recalibration of the antenna system. The amplification and phase shift of the T/R modules are obtained by considering the change in amplitude and phase of the test signal when it passes the T/R module. The control signals controlling the attenuators and the phase shifters in the T/R modules can now be corrected so that the amplification and the phase-shift are made to coincide with the desired amplification and phase-shift.

In accordance with the calibration procedure of plane array antennas in a production environment as taught by above-mentioned U.S. Pat. No. 7,068,218 (Göttl et al.), for example, a plane wave RF-source is used to simulate a point RF-source at infinity. If the propagation direction of the plane wave is parallel to the bore sight axis of the plane array, all array antenna elements are in the same phase conditions. This means that ideally measured phase values of the signal received by all array antenna elements are identical since each pair of array antenna elements and T/R module is assumed to be identical. The calibration procedure enables amplitude and phase characteristics of each pair of antenna element and T/R module to be determined.

When the calibration reference signal is derived from a distant source such as a satellite, the signal emanates from infinity so that its wavefront is effectively equidistant from all the antenna elements. It therefore arrives in the same phase at all the antenna elements. But it is not always practical to use a distant source for the calibration source, particularly when space is at a premium as is often the case in field calibration. Prior art approaches that employ so-called near field calibration are known to feed a planar calibration signal successively to the antenna elements. For example, U.S. Pat. No. 6,084,545 (Lier et al.) discloses a near-field calibration arrangement for a phased-array antenna that determines the phase shifts or attenuation of the elemental control elements of the array. The calibration system includes a probe located in the near field, and a calibration tone generator. According to the concept of reciprocity, the near field calibration procedure can be applied to transmit or receive modes as well. In case of receive calibration mode, a probe sequentially moves from one antenna element to another, keeping the same coupling conditions (distance from antenna plane, polarization, orientation etc.) and transmitting the same test signal. A receive antenna array has a switching arrangement, providing appropriate RF-module/antenna element connection to the measurement unit via controllable phase shifter/attenuator. The near-field calibration goal achieves the same signal parameters (phase and amplitude) coming from each RF-module (and appropriate probe locations) by applying control signals to the appropriate phase shifters and attenuators.

It should also be noted that regardless of whether near field or far filed calibration is performed, when a calibration network is factory-calibrated, sets of calibration values must be pre-assigned to each antenna. These values cannot be determined in the field and are apt to be inapplicable to a replacement antenna element, so that if an antenna element is replaced in the field, such an approach is fraught with difficulty.

In summary, far field calibration allows the calibration signal to be fed simultaneously to all the antenna elements from a common source and ensures that it will arrive at the same phase at all the antenna elements; but is not suitable for use in confined spaces, such as when re-calibrating antenna elements in the field. On the other hand, near field calibration requires that in order for the external calibration signal to arrive at the same phase at all the antenna elements, it must be fed to each antenna element sequentially and this requires precise alignment which is time-consuming and expensive.

It would therefore be desirable to combine the advantages of both approaches so as to calibrate the antenna elements using an external calibration signal that is fed from a common source that is proximate the antenna elements so as to reach all the antenna elements simultaneously, while nevertheless correcting for the fact that the external calibration signal arrives at different phases to each of the antenna elements.

SUMMARY OF THE INVENTION

Briefly, a phased antenna arrangement in accordance with an embodiment of the invention comprises an array antenna per se, including a plurality of antenna elements, a plurality of receiving channels, an injection unit for injection of calibrating signals into the receiving channels, a point RF-source, located in a far field zone, a distance measurement unit, an amplitude and phase measurement unit and a data processing unit.

According to one aspect of the invention, there is provided a method for estimating the calibration ratio of an active phased antenna having a plurality of phased array antenna elements, the method comprising:

injecting an internal calibrating signal having a known amplitude and phase to each antenna element;

sequentially injecting an external calibration signal from a stationary RF-source to all of the phased array antenna elements so that different phases of the external calibration signal arrive at each of the antenna elements;

compensating for differences in phases of the external calibration signal reaching the antenna elements so as compute an effective signal amplitude that would reach all of the antenna elements at zero phase difference;

calculating calibration ratio as the ratio between the amplitude of the internal calibrating signal to the effective signal amplitude of the external calibration signal; and outputting said calibration ratios in a form for allowing calibration of the active phased antenna.

According to another aspect of the invention, there is provided a calibration ratio calculation system for use in calibrating a phased array antenna arrangement having a first plurality of phased array antenna elements connected to a second plurality of receiving channels, an integral calibration signal injection network for injecting respective calibration signals to each antenna element and an amplitude and phase measurement unit for measuring respective signal amplitude and phase for each antenna element, the calibration ratio calculation system comprising:

a probe for disposing in the near field of an aperture of the phased array antenna arrangement for injecting an external calibration signal from a stationary RF-source to all of the phased array antenna elements via a respective receiver connected to each of the antenna elements so that different phases of the external calibration signal arrive at each of the antenna elements, a signal correction unit for computing and applying a respective phase difference and amplitude difference to the respective external calibration signal for each antenna element so as to obtain a corrected external calibration signal at all of the antenna elements whose phase difference and amplitude difference is zero; and a calibration ratio processing unit coupled to the signal correction unit for calculating a complex number calibration ratio as the amplitude ratio and the phase difference of the internal calibrating signal relative to the corrected external calibration signal.

According to yet another aspect of the invention there is provided a calibration system for calibrating a phased array antenna arrangement having a first plurality of phased array antenna elements connected to a second plurality of receiving channels, an integral calibration signal injection network for injecting respective calibration signals to each antenna element and an amplitude and phase measurement unit for measuring respective signal amplitude and phase for each antenna element, said calibration system comprising:

a probe disposed in the near field of an aperture of the phased array antenna arrangement for injecting an external calibration signal from a stationary RF-source to all of the phased array antenna elements via a respective receiver connected to each of the antenna elements so that different phases of the external calibration signal arrive at each of the antenna elements, a signal correction unit for computing and applying a respective phase difference and amplitude difference to the respective external calibration signal for each antenna element so as to obtain a corrected external calibration signal at all of the antenna elements whose phase difference and amplitude difference is zero; and a calibration ratio processing unit coupled to the signal correction unit for calculating a complex number calibration ratio as the amplitude ratio and the phase difference of the internal calibrating signal relative to the corrected external calibration signal.

According to a fourth aspect of the invention, there is provided a calibration signal injection network for injecting respective calibration signals to each antenna element of a phased array antenna arrangement having an amplitude and phase measurement unit for measuring respective signal amplitude and phase for each antenna element, said calibration signal injection network comprising:

a corporate feed for injecting an internal calibration signal to said antenna elements;

a plurality of signal dividers connected to the corporate feed; and a plurality of couplers connected to the dividers for conveying a fraction of the internal calibration signal to respective antenna elements of the phased array antenna arrangement;

whereby a calibration ratio of the phased array antenna arrangement may be determined regardless of physical changes with time of components and interconnections of the calibration signal injection network by:

injecting an internal calibrating signal to the corporate feed;

sequentially injecting an external calibration signal from a stationary RF-source to all of the phased array antenna elements so that different phases of the external calibration signal arrive at each of the antenna elements;

compensating for differences in phases of the external calibration signal reaching the antenna elements so as compute an effective signal amplitude that would reach all of the antenna elements at zero phase difference;

calculating calibration ratio as the ratio between the amplitude of the internal calibrating signal to the effective signal amplitude of the external calibration signal; and outputting said calibration ratios in a form for allowing calibration of the active phased antenna.

Such a calibration signal injection network may be provided integral with a phased array antenna, resulting in a cost-effective phased array antenna arrangement that is amenable to field calibration without expensive and complex alignment procedures.

During actual use of the phased array antenna, a steering/tracking signal is fed to the antenna elements and generates a charge/current distribution over the antenna aperture corresponding to a desired far field antenna pattern. This distribution is governed by certain controls applied to Tx/Rx modules in the corresponding receiving channels which are separated from the antenna aperture by cables and other electrical components. The determination of these controls is affected by the cables and components and by the desired current distribution.

The calibration procedure to which the present invention is directed serves to estimate the contribution of cables and other electric components. This procedure must be repeated quite often, especially when the ambient temperature changes significantly. The electrical paths, over which signals flow during actual use of the phased array antenna and during calibration, are not identical. That is to say there is a different path that is used for operational purposes to the one used for maintenance purposes—calibration being one of them.

The signals used in the calibration procedure flow through the channel which is calibrated and also through the internal injection network, which constitutes the difference between the two paths. The gateway between the channel and the internal injection network is implemented by a plurality of couplers located in the antenna in one-to-one correspondence with antenna elements. Since signals used in operational modes come and go from/to infinity while those in calibration come and go from/to the internal calibration network, the difference among various paths must be compensated for.

This is done by measuring the ratio between signals flowing over corresponding paths. In practice, this may be done using various methods such as the automatic network analyzer, the near field test range, or others. The invention employs a horn since it is easily implemented under field conditions.

In accordance with one embodiment, such a method comprises the following process stages: measuring distance between the phased array antenna and the point RF-source, measuring antenna allocation parameters, measuring the signals injected by means for internal injecting calibrating signals and the point RF-source, estimating configuration of phase front emanated by the point RF-source and phase component of calibration ratio using regression analysis.

As mentioned above, prior art calibration methods enable each pair of array antenna elements and transmitting/receiving channels to be calibrated together only. Replacement of an array antenna element and/or one/or several transmitting/receiving channels results in a lack of calibration. As usually plane wave RF-sources are extremely expensive and unwieldy, recalibration in the field conditions is time-consuming and expensive.

It would therefore clearly be desirable to make possible calibrating array antenna per se and to nullify the effect of the receiving channel on the calibration results.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
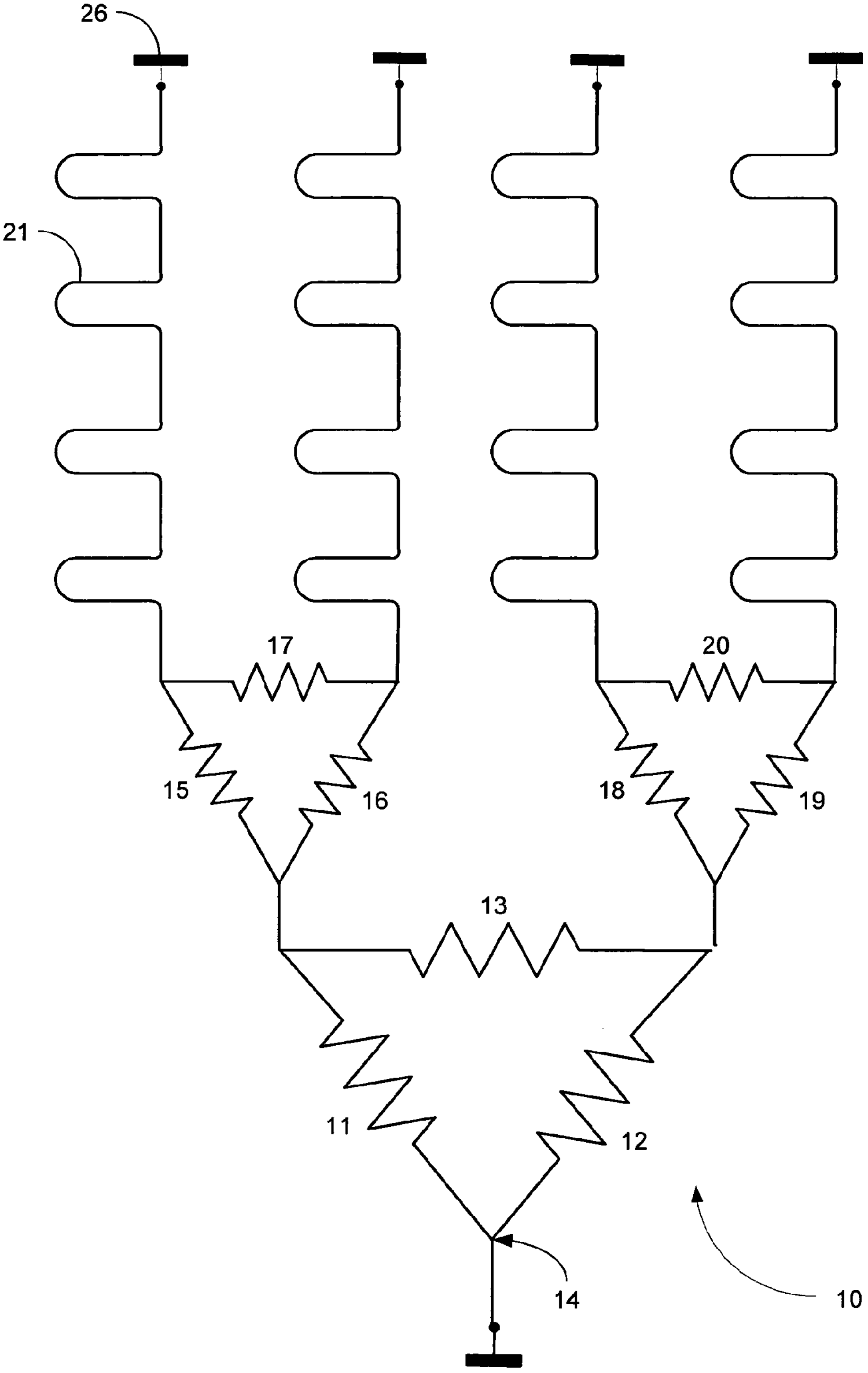
FIG. 1 shows a simple calibration signal injection network that may be used with the invention.

The principles of the method and system according to the present invention may be better understood with reference to the drawings and the accompanying description, wherein like reference numerals have been used throughout to designate identical elements. It being understood that these drawings which are not necessarily to scale, are given for illustrative purposes only and are not intended to limit the scope of the invention. It should be noted that the blocks as well other elements in these figures are intended as functional entities only, such that the functional relationships between, the entities are shown, rather than any physical connections and/or physical relationships. Those versed in the art should appreciate that many of the examples provided have suitable alternatives which may be utilized.

FIG. 1 shows a simple calibration signal injection network 10 having a triad of dividers 11, 12 and 13 interconnected so that a common junction of the dividers 11 and 12 serves as a corporate feed point 14 for injecting an input signal into the network. Respective junctions between opposite ends of the divider 13 and respective ends of the dividers 11 and 12 are connected to similar divider triads comprising dividers 15, 16, 17 and 18, 19, 20. Thus, the dividers 15 and 16 are commonly connected at a first end to one end of the divider 13 whose other end is commonly connected to a first end of the dividers 18 and 19. The second ends of the dividers 15, 16, 18 and 19 are connected to respective couplers 21 each of which is terminated by a respective termination 26. The input signal is split initially at the junction between the dividers 11 and 12 and is again split at each of the respective junctions between dividers 15, 16 and 18, 19. Depending on the values of the dividers, different currents will flow through each of the couplers 21.

Figure 3:
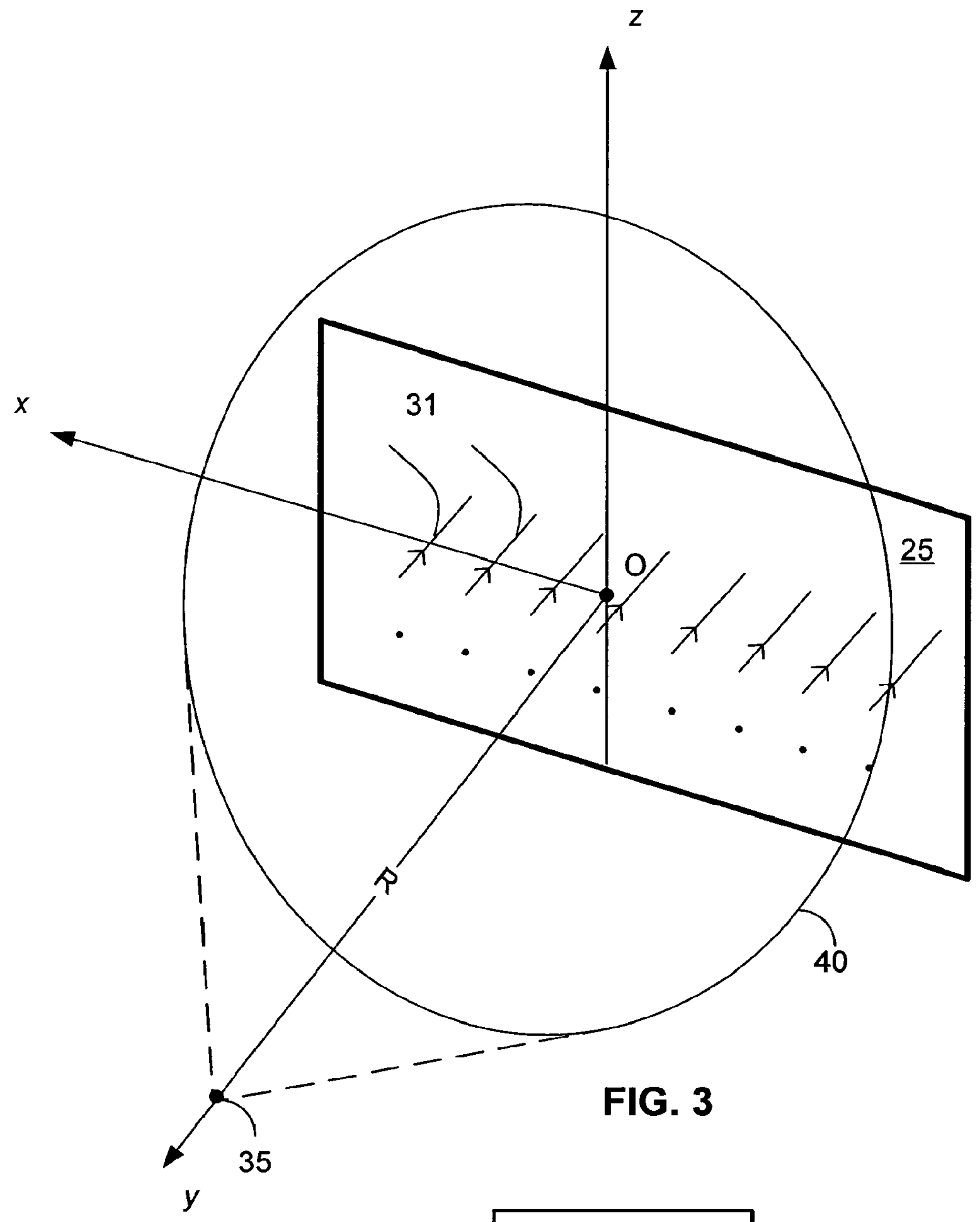
FIG. 3 is a pictorial representation showing the spatial arrangement of the point RF-source and a plurality of phased array antenna elements according to an embodiment of the invention.

Referring to FIG. 1 and FIG. 3 together, the calibration signal injection network 10 is interposed between an array of antenna elements 31 and a ground plane 25, so that when a single input signal is fed to the corporate feed point 14 of the calibration network 10, respective steering signals are fed to each of the antenna elements 31 via respective phase shifters and amplifiers that are known per se and are not shown in the figures and that can be inductively coupled to the couplers 21. The values of the steering signals fed to each antenna element are predetermined by the values of the dividers in the calibration network 10 and are thus known in advance.

When an antenna array is calibrated using the calibration signal injection network 10, an input signal is fed to the corporate feed point 14 and the output signals flowing through each antenna element is measured. Any offset in amplitude or phase from a respective desired value is measured and the corresponding amplitude and phase offsets are determined.

In conventional use of such a calibration signal injection network, precise adjustment is required to ensure that the signals fed via the couplers 21 to the antenna element are identical in amplitude and phase. Not only does this require precise calibration as noted above, but it also means if values of the components of the calibration signal injection network change for any reason, e.g. owing to changes in ambient temperature that may induce changes to the lengths of connectors, such changes must be compensated for. This requires expensive circuitry, which has not been shown in FIG. 1 but is essential in order that the calibration signal injection network shown therein may be functional according to known calibration procedures. Such circuitry is not required in the invention and this greatly reduces the complexity of a phased array antenna arrangement having such an integral calibration signal injection network.

Figure 2:
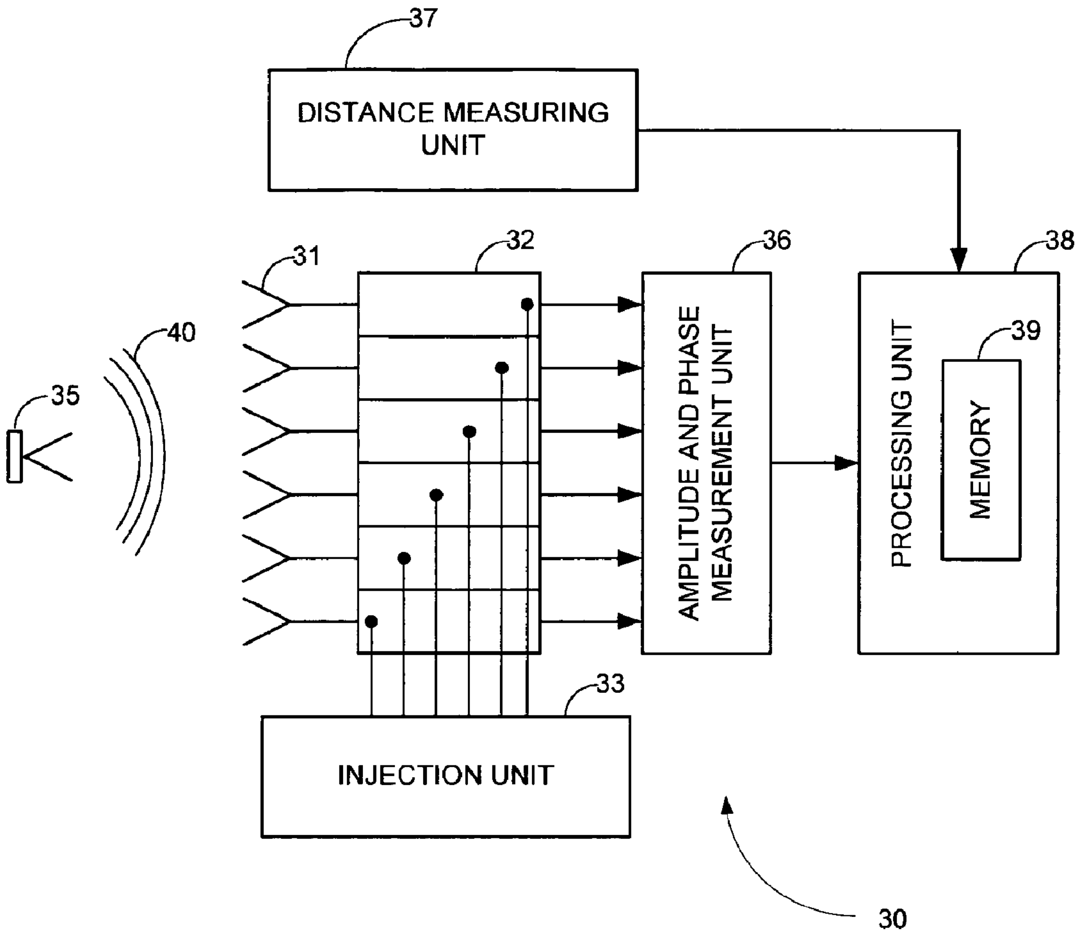
FIG. 2 is a block diagram of the phased array antenna arrangement using the point RF-source for calculating calibration ratio according to an embodiment of the invention.

FIG. 2 shows a phase array antenna arrangement 30 that includes a plurality of array antenna elements 31, a ground plane (not shown), a plurality of receiving channels 32, an internal injection unit 33 for injecting calibrating signals, a point RF-source 35, an amplitude and phase measurement unit 36, a distance measurement unit 37 and a processing unit 38 having a memory 39. Each antenna element 31 is connected to a respective receiving channel 32. Signals received by the receiving channels 32 are measured by the amplitude and phase measurement unit 36 and the measured data are stored in the memory 39 and processed by the data processing unit 38.

Thus, in such an arrangement there are two sources of RF-signals. The first is the internal injection unit 33 that is coupled to antenna elements 31 and to the receiving channels 32, while the second is the point RF-source 35 from which a spherical wave 40 emanates toward the plurality of the antenna elements 31. Comparison of measurement results of these two signals enables derivation of the so-called phase component of calibration ratio attributed to the plurality of antenna elements.

Statistical methods of data processing used in this invention enable the estimation accuracy to be improved owing to repeated measurements that are performed at slightly different geometrical conditions. Signals provided by the injection unit 33 are considered stable and are measured only once per session.

FIG. 3 shows the spatial arrangement of the point RF-source 35 and the plurality of array antenna elements 31 in the coordinate system.

The concept of calibration ratio estimation using the point source test is based on the phase front having a smooth and continuous spherical surface corresponding to a geometrical location of points that are equidistantly located relative to the phase centre of the source. This phase front can be viewed as spherical, if it is in the far field zones during each independent measurement. Even for a real point RF-source 35 having a maximum aperture dimension $D \approx (4\lambda)$, the conditions of far field are met, namely that:

$$r > \frac{(2 \div 3)D^2}{\lambda} \tag{1}$$

(or $r_{min}=50\lambda$);

where: r is the distance from the phase centre of the RF-source,

D is an aperture of the RF-source, and $\lambda$ is the wavelength of the RF-radiation.

In FIG. 3, the point of origin O coincides with a phase center of the plurality of antenna elements 31. Axis Y coincides with the bore sight axis of the antenna elements 31. As shown above in Eqn. (1), a real point RF-source with aperture $4\lambda$ may be placed at a distance of $50\lambda$ or greater.

Turning back to FIG. 2, the signal emanated by the point RF-source 35 and measured by the amplitude and phase measurement unit 36 is subject to phase delay at several points: (i) transfer of the spherical wave 40 from the point RF-source 35 to the antenna elements 31; (ii) "phase shift" at the antenna elements 31; (iii) phase change in the receiving channels 32. The signal injected by the injection unit 33 into the receiving channels 32 is subjected to the phase change caused by passing through the plurality of receiving channels 32, i.e.

$$\phi_{PS}=\phi_T+\phi_{CR}+\phi_I \tag{2}$$

where: $\phi_{PS}$ is the measured phase value of the point RF-source 35, $\phi_T$ is the phase shift caused by wave transfer from the point RF-source 35 to the antenna elements 31, $\phi_{CR}$ is the phase shift on the antenna elements 31, and $\phi_I$ is the phase value of the internal calibrating signal.

As shown in FIG. 3 all the antenna elements are located in the XZ plane (Y=0) and the polar coordinates of the point RF-source 35 are (0,R,0) in the case where the point RF-source 35 is located exactly on the antenna bore-sight axis.

Transfer of the spherical wave front 40 from the point RF-source 35 to the j-th antenna element 31 produces a phase difference given by:

$$\varphi_T(R, j) = \frac{2\pi}{\lambda}\left[\sqrt{(X_j - X_{PS}(R))^2 + (Y_{PS}(R))^2 + (Z_j - Z_{PS}(R))^2} - R\right] \tag{3}$$

where $X_j$, $Y_j$, $Z_j$ are the coordinates of the j-th antenna element 31, and $X_{PS}$, $Y_{PS}$, $Z_{PS}$ are coordinates of the point RF-source 35.

In the case where the point RF-source 35 is exactly located exactly on the Y-axis, the phase difference is given by:

$$\varphi_T(R, j) = \frac{2\pi}{\lambda}\left[\sqrt{X_j^2 + R^2 + Z_j^2} - R\right] \tag{4}$$

Usually, the antenna element lattice is rectangular with element separation about $\lambda/2$. For a large antenna of more than $40\lambda$ width, the peripheral elements can have wave front phases different from that of the central element by approximately $8\pi$, but the phase difference between neighboring elements does not exceed $0.18\pi$. The fact that the phase difference between neighboring elements is only a small fraction of the complete cycle allows for an unwrapping algorithm to resolve the intrinsic ambiguity caused by arithmetic operations on periodic operands i.e. phases.

An important aspect of the point RF-source test is the use of iterative fitting of the phase fronts for two successive distances R2>R1, finding coordinates of the phase centre of the point RF-source 35 $X_{PS}(R)$, $Y_{PS}(R)$, $Z_{PS}(R)$ for each one with minimum fitting errors and estimation, and the calibration of ratio phases, according to the basic equation:

$$\phi_{CR}(j)=\phi_{PS}(j)-\phi_T(j)-\phi_I(j) \tag{5}$$

As noted above the method of calibration ratio estimation includes two stages: performing measurements and data processing.

Figure 4:
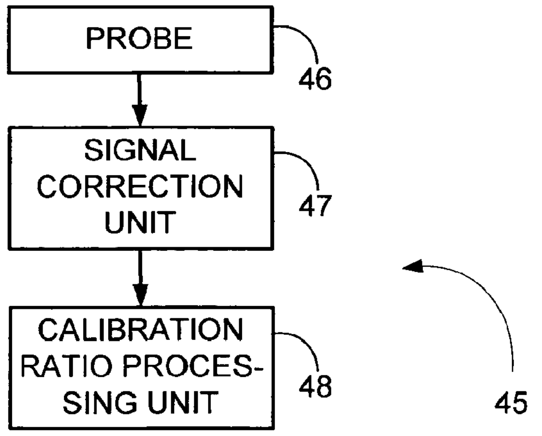
FIG. 4 is a block diagram showing the functionality of a system for calculating calibration ratio according to an embodiment of the invention.

FIG. 4 is a block diagram showing the functionality of a calibration ratio calculation system 45 for use in calibrating a phased array antenna arrangement 30 such as shown in FIG. 1. The calibration ratio calculation system 45 comprises a probe 46 for disposing in the near field of an aperture of the phased array antenna arrangement for injecting an external calibration signal from a stationary RF-source to all of the phased array antenna elements via a respective receiver connected to each of the antenna elements so that different phases of the external calibration signal arrive at each of the antenna elements.

The calibration ratio calculation system 45 further comprises a signal correction unit 47 for computing and applying a respective phase difference and amplitude difference to the respective external calibration signal for each antenna element so as to obtain a corrected external calibration signal at all of the antenna elements whose phase difference and amplitude difference is zero. A calibration ratio processing unit 48 is coupled to the signal correction unit 47 for calculating a complex number calibration ratio as the amplitude ratio and the phase difference of the internal calibrating signal relative to the corrected external calibration signal.

Figure 5:
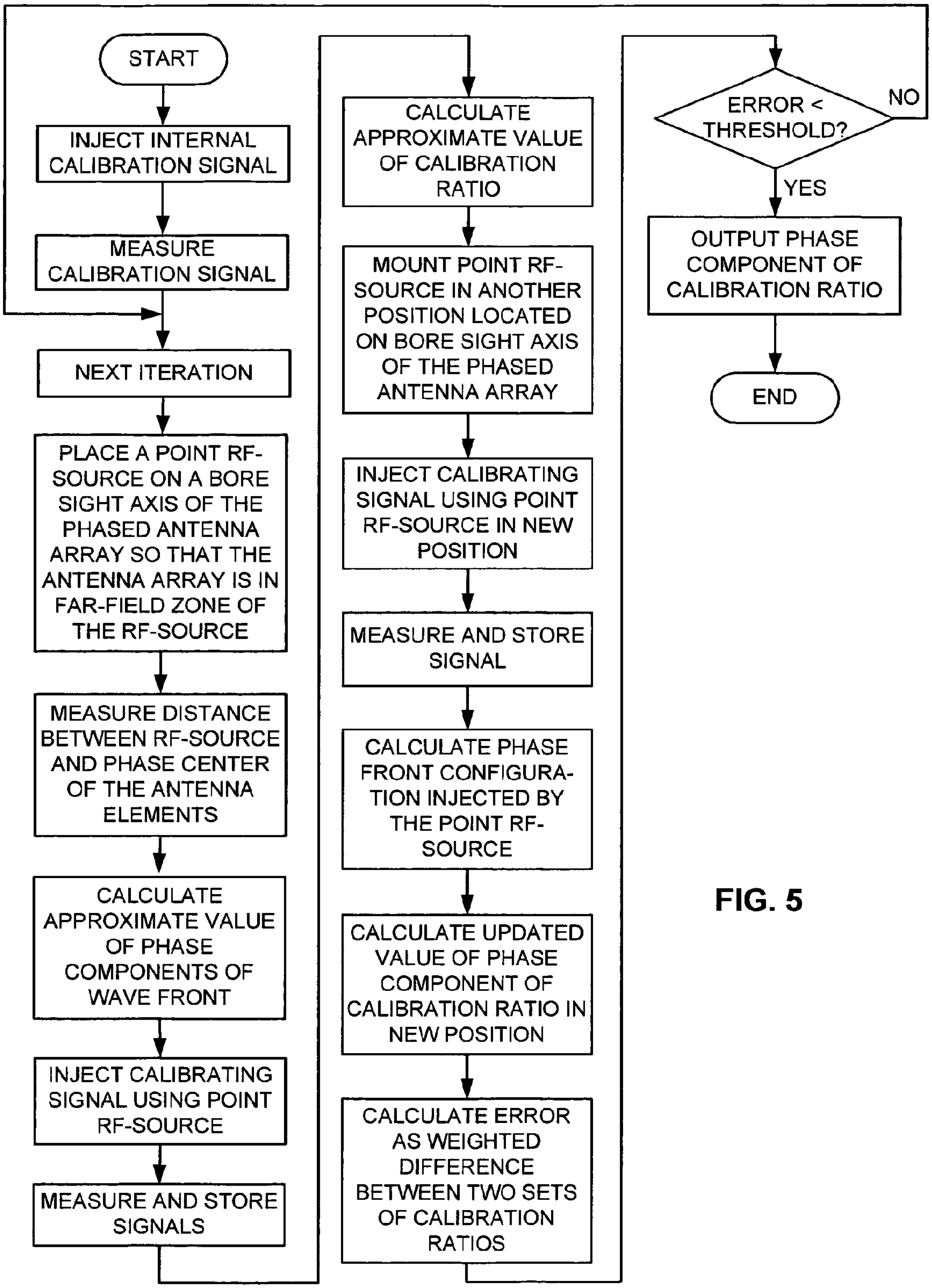
FIG. 5 is a flow diagram showing a sequence of operations for calculating calibration ratio according to an embodiment of the invention.

FIG. 5 is a flowchart showing the principal operations required to estimate calibration ratio according to an embodiment of the invention. In somewhat expanded detail, the sequence of operations includes the following:

- a. inject internal calibrating signal to all antenna elements,
- b. measure and store the injected signal (the signal is sampled and digitized by the receiving channel (32 in FIG. 2) and the amplitude and phase are measured by the amplitude and phase measurement unit (36 in FIG. 2))
- c. Start the following loop for successive iterations:
  - i) place a point RF-source in the working position,
  - ii) measure the distance between the point RF-source (35 in FIG. 2) and phase center of the antenna elements (31 in FIG. 2),
  - iii) optionally store measurement data for subsequent retrieval by a different unit, although this is not necessary if subsequent processing is carried out either by the same unit or by one coupled thereto,
  - iv) load stored data if subsequent processing is carried out by a different unit,
  - v) calculate an approximate value of $\phi_{CR}$ of wave front,
  - vi) injecting external calibrating signal using the point RF-source at the current working position,
  - vii) measuring the RF signal from external source,
  - viii) storing measurement results,
  - ix) calculate approximate value of calibration ratio,
  - x) place a point RF-source in another working position,
  - xi) inject external calibrating signal using the point RF-source at the new working position,
  - xii) measure and store the signal from external source at the new working position,
  - xiii) optionally store measurement data for subsequent retrieval by a different unit, although this is not necessary if subsequent processing is carried out either by the same unit or by one coupled thereto,
  - xiv) load stored measurement data if subsequent processing is carried out by a different unit, xv) calculate phase front configuration injected by the point RF-source in its new position. This may be done using regression analysis, xvi) calculate an updated value of the phase component of the calibration ratio for the point RF-source in the new position, xvii) calculate error as weighted difference between two sets of calibration ratios, xviii) if error is not less than specified threshold, perform successive iteration (i.e. branch to i)); otherwise d. output phase component of calibration ratio.

This results in a form suitable for allowing calibration of the active phased antenna. Thus, typically the calibration ratios are tabulated and used to apply corrections to the amplitude and phase of the fractional external calibration signal applied to each antenna element as explained above.

Referring to FIG. 2 and FIG. 5 together, for the sake of clarity we will limit our consideration to two working positions (i.e. just two iterations) of the point RF-source, but note that the algorithm may be repeated using different positions so as to smooth out noisy measurements. In accordance with an embodiment of the invention, during an initial stage of the calibration process, the internal calibration is implemented. The injection unit 33 is assumed to be stable, therefore $\phi_I$ is measured only once for each session. The injection unit 33 injects the signal into each receiving channel 32. Each signal passing through the receiving channel 32 is measured by the amplitude and phase measurement unit 36. Measurement data are stored in the memory 39. To calculate the phase shift at each array antenna element, the location of the antenna element must be known. Therefore the parameters of the array antenna element allocation are measured and stored.

The first cycle of the procedure starts from placing the point RF-source 35 into a working position. A horn antenna used as the point RF-source 35 is placed in proximity of the bore sight axis of the array antenna elements 31 (that coincides with the Y axis in FIG. 2). The distance between the point RF-source 35 and the array antenna elements 31 is measured by the distance measuring unit 37, which may be, for example, a laser rangefinder. Measurement data are stored in data processing unit 38.

During a subsequent stage of the calibration process at least two measurements of the signal from point RF-source 35 are performed at different locations of the point RF-source 35 relative to the plurality of antenna elements 31.

As the precise location of the point RF-source 35 on the bore sight axis of the antenna cannot be provided, this uncertainty creates some azimuth/elevation steering of the calibration ratio estimation. This steering is solved using regression analysis. During the test, the measurements of signals emanated by the point RF-source 35 and received by the antenna elements 31 are performed for each antenna element separately.

The data processing algorithm will now be described. After downloading measurement data of distance between the point RF-source 35 and the plurality of array antenna elements 31 and allocation data of the array antenna elements 31 into working range of the data processing unit 38 the estimation process of phase front configuration begins with the first guess of the phase center location point RF-source 35 in the first position. It is assumed to be (0,R1,0) (see FIG. 2), where R1 is the result provided by the distance measuring unit 37. The first estimation of calibration ratio is calculated as follows:

$$\varphi_{CR}(R1, j) = \varphi_{PS}(R1, j) - \varphi_I(j) - \frac{2\pi}{\lambda}\left[\sqrt{X_j^2 + R1^2 + Z_j^2} - R1\right] \tag{6}$$

Methods of regression analysis enable the phase front emanated by the point RF-source 35 in the second position using $\phi_{CR}$ (R1,j), to be calculated as follows:

$$\hat{\phi}_T(R2,j) = \phi_{PS}(R2,j) - \phi_I(j) - \phi_{CR}(R1,j) \tag{7}$$

The phase front at this stage of the algorithm is very close to spherical, but this sphere can be rotated, because of displacement of the point RF-source 35 relative to antenna broadside axis. Regression analysis methods are applied to the phase front, the steering phase offset $\phi_{Trend}$ (R2, j) is calculated and a new (corrected) phase front of point RF-source 35 is updated according to:

$$\phi_{PS}^0(R2,j) = \phi_{PS}(R2,j) + \phi_{Trend}(R2,j) \tag{8}$$

Then after downloading measurement data of the external calibration in the second position, the phase front configuration is calculated using regression analysis:

$$\hat{\phi}_T(R2,j) = \phi_{PS}^0(R2,j) - \phi_I(j) - \phi_{CR}(R1,j) \tag{9}$$

The fitting algorithm minimizes the value of:

$$\sum_j \left[\hat{\varphi}_T(R2, j) - \frac{2\pi}{\lambda} \sqrt{(X_j - X_{PS}(R2, j))^2 + (Y_j - Y_{PS}(R2, j))^2 + (Z_j - Z_{PS}(R2, j))^2} - R2\right]^2 = \min \tag{10}$$

As a result, the values of phase centre location of the point RF-source 35 $X_{PS}$, $Y_{PS}$, $Z_{PS}$ are estimated. The phase of wave front for second test point is calculated:

$$\varphi_T(R2, j) = \frac{2\pi}{\lambda}\left[\sqrt{(X_j - X_{PS}(R2))^2 + (Y_{PS}(R2))^2 + (Z_j - Z_{PS}(R2))^2} - R2\right] \tag{11}$$

and a new value of calibration ratio can be estimated as follows:

$$\phi_{CR}(R2,j) = \phi_{PS}(R2,j) - \phi_I(j) - \phi_T(R2,j) \tag{12}$$

The value of $\phi_{CR}$(R2,j) thus obtained is used for calculating the phase front configuration for the point RF-source in the first position. After loading the measurement data relating to external calibration in the first position, the corresponding phase front configuration is calculated using regression analysis:

$$\hat{\phi}_T(R1,j) = \phi_{PS}(R1,j) - \phi_{II}(j) - \phi_{CR}(R2,j) \tag{13}$$

The results are now fitted by minimizing the value:

$$\left|\hat{\varphi}_T(R1, j) - \frac{2\pi}{\lambda}\left[\sqrt{(X_j - X_{PS}(R1))^2 + (Y_{PS}(R1))^2 + (Z_j - Z_{PS}(R1))^2} - R1\right]\right| \tag{14}$$

Finally the calibration ratio is calculated for the initial test point:

$$\phi_{CR}(R1,j)=\phi_{PS}(R1,j)-\phi_I(j)-\phi_T(R1,j,(X_{PS1},Y_{PS1},Z_{PS1})) \quad (15)$$

During subsequent stages, an error vector of $\phi_{CR}$ is calculated and compared (op. 370) with a predetermined criterion.

This algorithm can be implemented repeatedly or may be terminated. The value $\phi_{CR}$ obtained in the previous cycle is used for calculating $\phi_{Trend}$ in the next cycle.

It will also be understood that the system according to the invention may use a suitably programmed computer or a computer program readable by a computer for executing the method of the invention. The invention further contemplates a machine-readable memory tangibly embodying a program of instructions executable by the machine for executing the method of the invention.

As such, those skilled in the art to which the present invention pertains, can appreciate that while the present invention has been described in terms of preferred embodiments, the concept upon which this disclosure is based may readily be utilized as a basis for the designing of other structures and processes for carrying out the several purposes of the present invention.

Also, it is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A method for estimating the calibration ratio of an active phased antenna having a plurality of phased array antenna elements, the method comprising:

injecting an internal calibrating signal having a known amplitude and phase to each antenna element;

sequentially injecting an external calibration signal from a stationary RF-source to all of the phased array antenna elements so that different phases of the external calibration signal arrive at each of the antenna elements;

correcting for differences in phases and amplitudes of the external calibration signal reaching the antenna elements so as compute an effective signal that would reach all of the antenna elements at zero phase and amplitude differences;

calculating complex number calibration ratio as the amplitude ratio and the phase difference of the internal calibrating signal relative to the corrected external calibration signal; and outputting said calibration ratios for said plurality of phased array antenna elements in a form for allowing calibration of the active phased antenna.

2. The method according to claim 1, wherein repeated iterations are performed to meet a predetermined termination criterion.

3. The method according to claim 1, wherein the phase component of the calibration ratio of a previous position of the point RF-source is used for calculating the phase component of calibration ratio for a subsequent position the point RF-source.

4. The method according to claim 1, comprising:

a. injecting internal calibrating signal to all antenna elements;

b. measuring and storing the injected signal;

c. executing successive iterations by:

i) placing a point RF-source in the working position;

ii) measuring the distance between the point RF-source and the phase center of the antenna elements;

iii) calculating an approximate value of $\phi_{CR}$ of wave front;

iv) injecting external calibrating signal using the point RF-source at the current working position;

v) measuring the RF signal from external source;

vi) calculating approximate value of calibration ratio;

vii) placing a point RF-source in another working position;

viii) inject external calibrating signal using the point RF-source at the new working position;

ix) measuring and storing the signal from the external source at the new working position;

x) calculating the phase front configuration injected by the point RF-source in its new position;

xi) calculating an updated value of the phase component of the calibration ratio for the point RF-source in the new position;

xii) calculating error as weighted difference between two sets of calibration ratios;

xiii) if error is not less than specified threshold, performing successive iteration; and d. outputting phase component of calibration ratio.

5. The method according to claim 4, further comprising storing and retrieving measurement data.

6. The method according to claim 4, wherein calculating the phase front configuration is done using regression analysis.

7. A calibration ratio calculation system for use in calibrating a phased array antenna arrangement having a first plurality of phased array antenna elements connected to a second plurality of receiving channels, an integral calibration signal injection network for injecting respective calibration signals to each antenna element and an amplitude and phase measurement unit for measuring respective signal amplitude and phase for each antenna element, a probe for disposing in the near field of an aperture of the phased array antenna arrangement for injecting an external calibration signal from a stationary RF-source to all of the phased array antenna elements so that different phases of the external calibration signal arrive at each of the antenna elements;

a signal correction unit for computing and applying a respective phase difference and amplitude difference to the respective external calibration signal for each antenna element so as to obtain a corrected external calibration signal at all of the antenna elements whose phase difference and amplitude difference is zero; and a calibration ratio processing unit coupled to the signal correction unit for calculating a complex number calibration ratio as the amplitude ratio and the phase difference of the internal calibrating signal relative to the corrected external calibration signal.

8. A calibration system for calibrating a phased array antenna arrangement having a first plurality of phased array antenna elements connected to a second plurality of receiving channels, an integral calibration signal injection network for injecting respective calibration signals to each antenna element and a signal measurement unit (36) for measuring respective signal amplitude and phase for each antenna element, said calibration system characterized by the calibration ratio calculation system of claim 7.

9. A phased array antenna arrangement comprising an integral calibration signal injection network according to claim 8.

10. The phased array antenna arrangement according to claim 9, wherein there is an equal number of phased array antenna elements and receiving channels.

11. The phased array antenna arrangement according to claim 9, wherein the integral calibration signal injection network is coupled to each of the receiving channels.

12. The phased array antenna arrangement according to claim 9, wherein during calibration, the plurality of phased array antenna elements is located in the far-field zone of the point RF-source.

13. The phased array antenna arrangement according to claim 9, wherein during calibration, the point RF-source is located on the bore sight axis of the phased array antenna.

14. The calibration ratio calculation system of claim 7, wherein said calibration signal injection network comprising:

a corporate feed for injecting an internal calibration signal to said antenna elements;

a plurality of signal dividers connected to the corporate feed; and a plurality of couplers connected to the dividers for conveying a fraction of the internal calibration signal to respective antenna elements of the phased array antenna arrangement;

whereby a calibration ratio of the phased array antenna arrangement may be determined regardless of physical changes with time of components and interconnections of the calibration signal injection network by:

injecting an internal calibrating signal to the corporate feed;

sequentially injecting an external calibration signal from a stationary RF-source to all of the phased array antenna elements so that different phases of the external calibration signal arrive at each of the antenna elements;

compensating for differences in phases and amplitudes of the external calibration signal reaching the antenna elements so as compute an effective signal that would reach all of the antenna elements at zero phase and amplitude differences;

calculating complex number calibration ratio as the amplitude ratio and the phase difference of the internal calibrating signal relative to the corrected external calibration signal; and outputting said calibration ratios in a form for allowing calibration of the active phased antenna.

* * * * *